US010984223B2

(12) United States Patent
Storm et al.

(10) Patent No.: US 10,984,223 B2
(45) Date of Patent: Apr. 20, 2021

(54) REDUCTION OF SEARCH SPACE IN BIOMETRIC AUTHENTICATION SYSTEMS

(71) Applicant: Advanced New Technologies Co., Ltd., George Town (KY)

(72) Inventors: Gregory Lee Storm, Parkville, MO (US); David Norman Wagner, Kansas City, MO (US); Reza R. Derakhshani, Shawnee, KS (US); Mark Nuetzman, Liberty, MO (US); Ike Ellis, Overland Park, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/796,529

(22) Filed: Feb. 20, 2020

(65) Prior Publication Data

US 2020/0193143 A1 Jun. 18, 2020

Related U.S. Application Data

(63) Continuation of application No. 16/140,746, filed on Sep. 25, 2018.

(51) Int. Cl.
*G06K 9/00* (2006.01)
*G06K 9/46* (2006.01)
(Continued)

(52) U.S. Cl.
CPC ....... *G06K 9/00261* (2013.01); *G06K 9/0061* (2013.01); *G06K 9/4609* (2013.01); *G06Q 20/40145* (2013.01); *H04W 12/06* (2013.01)

(58) Field of Classification Search
None
See application file for complete search history.

(56) References Cited

U.S. PATENT DOCUMENTS 7,552,094 B2 * 6/2009 Park .................. G06Q 20/10
705/65
9,538,332 B1 1/2017 Mendelson
(Continued)

FOREIGN PATENT DOCUMENTS

| CN | 107341156 | 11/2017 |
|---|---|---|
| EP | 3358805 | 8/2018 |
| WO | WO 02084456 | 10/2002 |

OTHER PUBLICATIONS

PCT International Search Report and Written Opinion in International Application No. PCT/CN2019/107741, dated Dec. 25, 2019, 9 pages.

*Primary Examiner* — Michelle M Entezari
(74) *Attorney, Agent, or Firm* — Fish & Richardson P.C.

(57) ABSTRACT

Methods, systems, and apparatus, including computer programs encoded on a computer storage medium, for a biometric authentication system. In one aspect, a method includes broadcasting, through a transceiver, a signal that includes a kiosk identifier; receiving, from a server system, a reference image of the user based on a mobile computing device associated with the user having received the signal and providing the kiosk identifier to the server system; capturing, with a camera, an image of the user; and authenticating the user based on a comparison of the captured image of the user to the reference image of the user based on a comparison of the captured image of the user to the reference image of the user.

14 Claims, 7 Drawing Sheets

(51) Int. Cl.
*H04W 12/06* (2021.01)
*G06Q 20/40* (2012.01)

(56) References Cited

U.S. PATENT DOCUMENTS

| | | | |
|---|---|---|---|
| 10,078,425 B2* | 9/2018 | Ullrich | H04L 67/12 |
| 10,198,887 B2 | 2/2019 | Ogishi et al. | |
| 10,477,342 B2 | 11/2019 | Williams | |
| 10,511,943 B2* | 12/2019 | Venkatraman | G06Q 50/30 |
| 10,657,289 B2* | 5/2020 | Graf | G06F 21/629 |
| 10,769,413 B2 | 9/2020 | Cho et al. | |
| 10,834,764 B2* | 11/2020 | Smith | H04W 4/80 |
| 10,839,340 B2 | 11/2020 | Skaaksrud | |
| 2006/0082439 A1* | 4/2006 | Bazakos | G06K 9/00228 |
| | | | 340/5.82 |
| 2007/0246533 A1 | 10/2007 | Schempp, III et al. | |
| 2011/0320256 A1 | 12/2011 | Florucci et al. | |
| 2012/0268241 A1 | 10/2012 | Hanna et al. | |
| 2013/0263227 A1* | 10/2013 | Gongaware | H04L 63/08 |
| | | | 726/4 |
| 2014/0063191 A1 | 3/2014 | Bataller et al. | |
| 2014/0324638 A1* | 10/2014 | Khalid | H04B 5/0025 |
| | | | 705/27.1 |
| 2015/0109428 A1 | 4/2015 | Mechaley, Jr. | |
| 2015/0356563 A1* | 12/2015 | Vohra | G06Q 20/3224 |
| | | | 705/44 |
| 2016/0072915 A1* | 3/2016 | Decanne | G06F 16/24578 |
| | | | 715/728 |
| 2016/0277380 A1* | 9/2016 | Wagner | H04L 63/0861 |
| 2017/0169688 A1* | 6/2017 | Britt | G08B 21/0453 |
| 2017/0323279 A1* | 11/2017 | Dion | H04N 5/23206 |
| 2017/0372600 A1* | 12/2017 | Palin | H04L 67/2804 |
| 2018/0260833 A1 | 9/2018 | Khan et al. | |
| 2018/0300754 A1 | 10/2018 | Narasimhan et al. | |
| 2019/0044549 A1 | 2/2019 | Pillai et al. | |
| 2020/0008056 A1 | 1/2020 | Wu et al. | |

* cited by examiner

REDUCTION OF SEARCH SPACE IN BIOMETRIC AUTHENTICATION SYSTEMS

PRIORITY CLAIM

This application claims priority to U.S. application Ser. No. 16/140,746, filed on Sep. 25, 2018, the entire content of which is incorporated herein by reference.

TECHNICAL FIELD

This specification generally relates to biometric authentication of users using an integrated set of "Internet of Things" (IOT) sensors.

BACKGROUND

Biometrics allows a person to be identified and authenticated based on a set of recognizable and verifiable data, which are unique and specific to them. Biometric authentication includes the process of comparing data for a person's characteristics to that person's biometric "template" to determine resemblance. Biometric authentication systems can be grouped based on the physical characteristic employed to authenticate users. Examples of such systems include authentication based on fingerprints, hand geometry, palm veins, retina scans, iris scans, facial recognition, signatures, and voice analysis.

SUMMARY

Implementations of the present disclosure are generally directed to a biometric authentication system deployed via kiosk type devices. The kiosk may receive a unique identifier associated with a respective user, via the user's mobile device when that device comes into proximity to the kiosk. The baseline or template data for the users for whom unique identifiers are received may be retrieved from a data store. The retrieved data is employed by the biometric authentication system to authenticate users as they engage with the kiosk.

In a general implementation, systems, apparatus, and methods for authenticating a user at a kiosk device include broadcasting, through a transceiver, a signal that includes a kiosk identifier. A reference image of the user is received from a server system based on a mobile computing device associated with the user having received the signal and providing the kiosk identifier to the server system. An image of the user is captured with a camera. The user is authenticated based on a comparison of the captured image of the user to the reference image of the user based on a comparison of the captured image of the user to the reference image of the user.

In another general implementation, one or more non-transitory computer-readable storage media coupled to one or more processors and having instructions stored thereon which, when executed by the one or more processors, cause the one or more processors to perform operations that include: broadcasting, through a transceiver, a signal that includes a kiosk identifier. A reference image of the user is received from a server system based on a mobile computing device associated with the user having received the signal and providing the kiosk identifier to the server system. An image of the user is captured with a camera. The user is authenticated based on a comparison of the captured image of the user to the reference image of the user based on a comparison of the captured image of the user to the reference image of the user.

In yet another general implementation, a system includes a camera, a transceiver, a server system comprising as data store, and a kiosk device. The kiosk device comprising a one or more processors, and a computer-readable storage device coupled to the one or more processors and having instructions stored thereon which, when executed by the one or more processors, cause the one or more processors to perform operations that include: broadcasting, through a transceiver, a signal that includes a kiosk identifier. A reference image of the user is received from a server system based on a mobile computing device associated with the user having received the signal and providing the kiosk identifier to the server system. An image of the user is captured with a camera. The user is authenticated based on a comparison of the captured image of the user to the reference image of the user based on a comparison of the captured image of the user to the reference image of the user.

An aspect combinable with the general implementations, the operations or method includes generating a score value based on comparing the captured image of the user to the reference image, wherein authenticating the user is based on the score value meeting a threshold.

In an aspect combinable with any of the previous aspects, the operations or method includes extracting from the captured image of user features derived from a face of the user, an iris of the user, or vasculature underlying a sclera of an eye of the user, wherein the score value is based on comparing the extracted user features to like features extracted from the reference image In an aspect combinable with any of the previous aspects, the transceiver comprises a Bluetooth beacon and wherein the signal comprises a Bluetooth low energy (BLE) signal.

In an aspect combinable with any of the previous aspects, the transceiver is located a threshold distance away from the kiosk device such that the mobile computing device receives the signal while in a background mode and before switching to an active mode to engage with the kiosk device.

In an aspect combinable with any of the previous aspects, authenticating the user is based on a comparison of the captured image of the user to the reference image of the user and reference images of a plurality of other users, the other users having been identified as within a threshold distance from the kiosk device.

In an aspect combinable with any of the previous aspects, wherein the reference image of the user and the reference images of the plurality of other users are ordered based on a determined proximity of a respective mobile device for each of the users, each of the mobile devices having provided the kiosk identifier to the server system.

In an aspect combinable with any of the previous aspects, the mobile computing device associated with the user provides characteristics of the signal to the server system.

In an aspect combinable with any of the previous aspects, the characteristics of the signal include signal strength, elapsed time, or directional data.

In an aspect combinable with any of the previous aspects, the reference image of the user was captured during an enrollment process.

In an aspect combinable with any of the previous aspects, the operations or method includes deducting payment from an account linked to the user based on the authentication of the user.

In an aspect combinable with any of the previous aspects, the operations or method includes displaying, on a display, information to the user based on the authentication of the user.

Particular implementations of the subject matter described in this disclosure can be implemented so as to realize one or more of the following advantages. First, identification of the unique identifiers of the users within broadcast range of the kiosk substantially reduces the identification search space—thus allowing much higher accuracy of identification with substantially less technically complex identification algorithms. Second, identification of unique identifiers before the user actually engages with the kiosk substantially reduces kiosk response time to the user (i.e. the search space is reduced on several orders of magnitude). Third, identification of unique user identifiers allows certain functionality to be implemented even for those users who are ultimately not identified by the kiosk (e.g., shoppers rather than exclusively buyers).

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
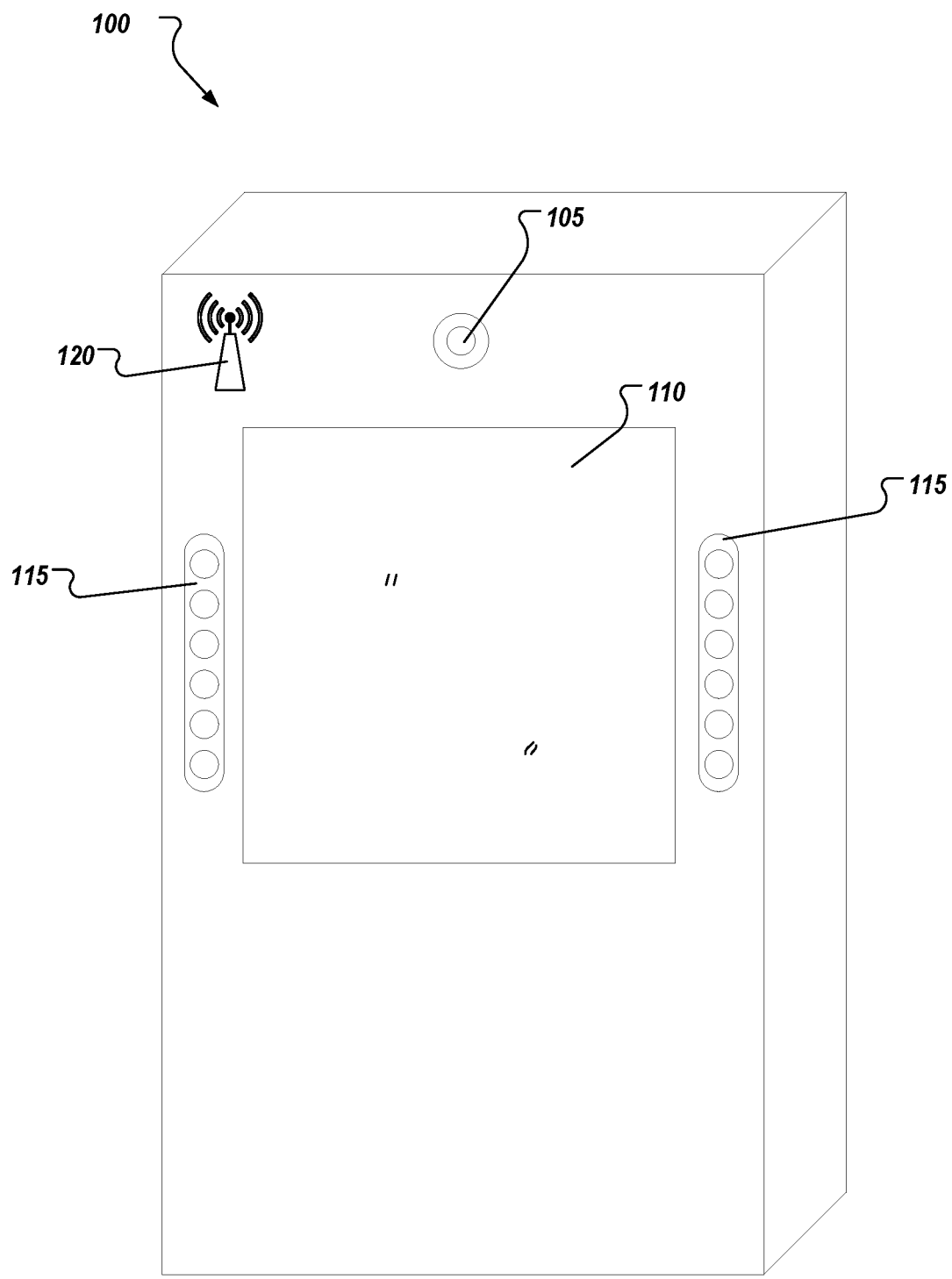
FIG. 1A-1C depicts a kiosk machine in example environments to which a biometric authentication system may deployed.

Implementations of the present disclosure are generally directed to a system deployed to authenticate users at a kiosk type device based on collected biometric data. More particularly, implementations of the present disclosure are directed to a biometric authentication system deployed within a kiosk type device that captures biometric data (e.g., a facial image, an eye print) that can be compared to baseline or template data to generate a multimodal-biometric score. In some implementations, the biometric authentication system may employ a transceiver device to broadcast a signal to mobile devices in proximity to the kiosk. From a back-end service, the kiosk may receive baseline or template data (e.g., enrollment images) for users associated with the mobile devices in proximity to the kiosk that have received the signal and provided a message indicating the proximity to the kiosk to the back-end service. The received data can be employed by the biometric authentication system to authenticate users as they engage with the kiosk. Services, such as collection of payment or withdraw of funds, are then provided to the users based on the authentication. The described biometric authentication system greatly reduces the amount of data that a kiosk must process to authenticate users as they engage with the system.

The disclosure is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Various biometric identification/authentication systems are based on capturing biometric data that can be compared with or analyzed with reference baseline or template data to generate a multimodal-biometric score. Biometric data refers to any computer data that is created during a biometric process. Authentication systems may employ models, templates, images, maps, similarity scores and so forth that are generated based on biometric data/traits collected from/about users, such as prints (e.g., eyeprints, fingerprints, foot prints, palm prints), retinal scans, pressure signatures (e.g., static, dynamic), face scans, gait measures, olfactory biometrics (e.g., odor), and auditory biometrics (e.g., voice prints). As more sensors and additional computing power become available additional identification vectors are being added regularly. All or a subset of the above biometric traits may be fused to provide a more accurate multimodal-biometric score from the aforesaid signals which can help the primary biometric modality in matching as well as anti-spoofing.

Various biometric identification/authentication systems are based on capturing one or more images, which are then compared with or analyzed with reference to template images captured during an enrollment process. For example, a biometric authentication system that employs face identification may require enrolling users to pose for one or more images of their face during an enrollment process. The images captured during the enrollment process may be stored on a storage device accessible to the biometric authentication system. During run-time, a facial image of a user can be captured and compared with one or more template images to determine if the user may be authenticated. In some examples, rather than having a small number of reference images to compare to, a biometric authentication system may have to authenticate a user based on, for example, a best match out of thousands if not millions of reference photos from various customers within the system. This process may take a large amount of time that may not be feasible in various contexts (e.g., authenticating a customer who is attempting to pay for his or her food at a quick service restaurant). Moreover, cutting down the amount of reference materials can reduce issues with false positives (e.g., two individuals that look similar enough to meet the threshold score).

In view of the foregoing, and as described in further detail herein, implementations of the present disclosure provide for a biometric authentication system, which can be deployed using, for example, a kiosk type device. Such devices can be configured to, for example, collect payments or as an automated teller machine (ATM). The described biometric authentication system may employ a transmitter, such as a Bluetooth beacon. In some implementations, the described biometric authentication system obtains, from nearby portable electronic devices (mobile devices), user information, such as a unique identifier, associated with each respective device. Mobile devices include smartphones, tablets, Personal Digital Assistants (PDAs), other "wearable" devices, and so forth. The user information can be used to retrieve reference biometric templates for the user (e.g., a reference image(s) of the user). The described biometric authentication system may also include a camera that can be employed to capture run-time images of users. In some implementations, these run-time images can be compared to the retrieved reference images for the users associated with devices that have been identified as in proximity to the kiosk. Based on these comparison, a user's identity can be verify/authenticated. Thus, the described system may be employed to reduce the number of reference biometric templates (e.g., the number of people) that have to be searched for each authentication. The described biometric authentication system provides multi-fold advantages, such as increased privacy, technical simplicity and feasibility, decreased power consumption, smaller identifier sequence, extra layers of verification, increases efficiency, reduction in fraud, and better overall scaling.

FIG. 1A depicts a kiosk machine 100 as an example environment to which a biometric authentication system may deployed. Such kiosk machines may be used for various purposes that require authenticating users via one or more biometric authentication processes. For example, the kiosk 100 can be configures as an ATM that allows a user to withdraw money from a bank account. As another example, the kiosk 100 may configured as a payment/ordering machine in a restaurant or store.

The kiosk 100 includes one or more components that support a biometric authentication system. As depicted, the kiosk 100 includes a camera 105, a display 110, illumination sources 115, and a transceiver 120. Other configurations of the kiosk 100 may include other types of components depending to the configured purpose. In some implementations, display 110 displays information to the user 140. The display may also be used by the user 140 to interact with the kiosk 140. For example, the display may be a touch screen displaying a graphical user interface (GUI) through which the user 140 can enter and receive data.

Figure 1B:
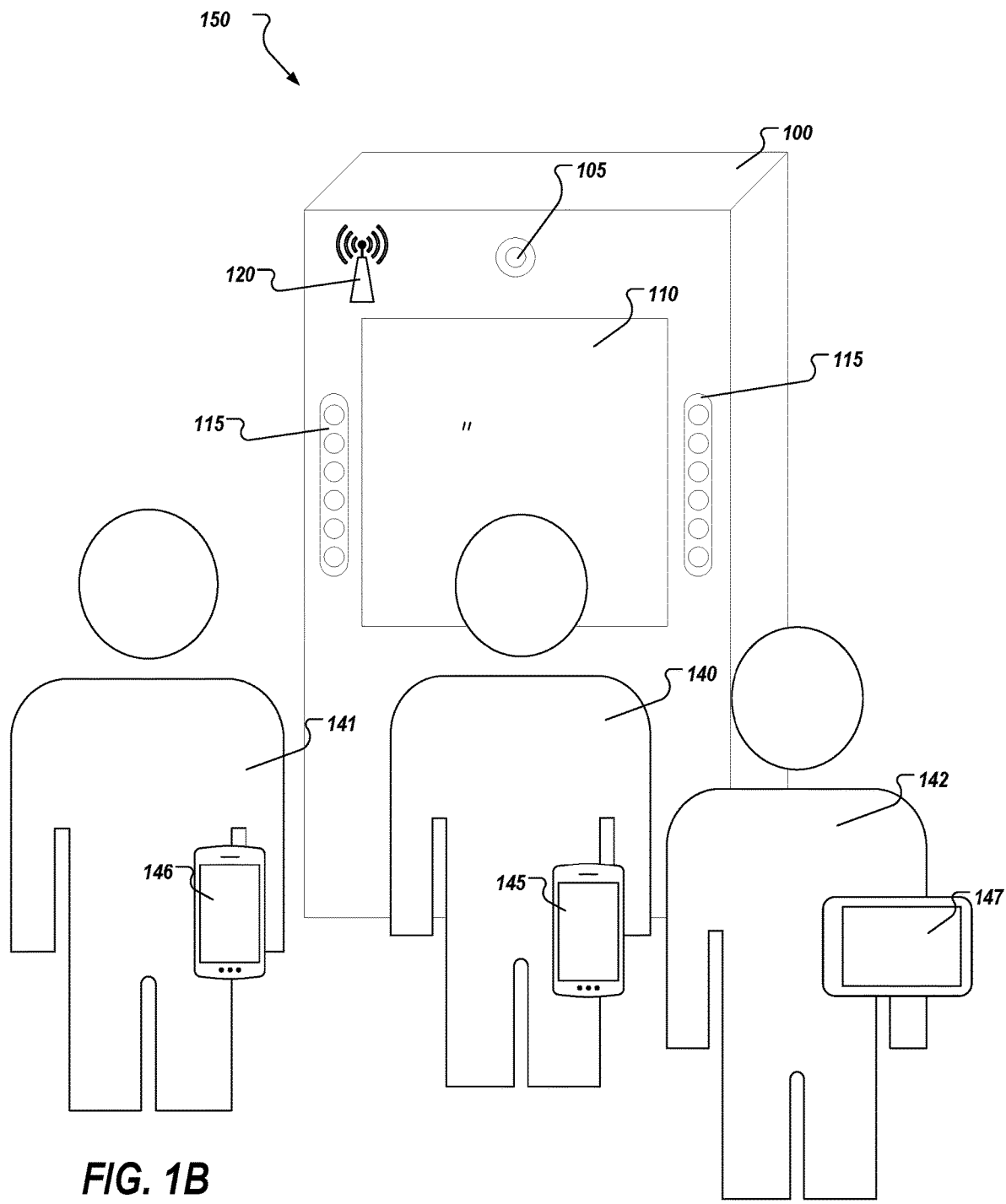
Figure 1C:
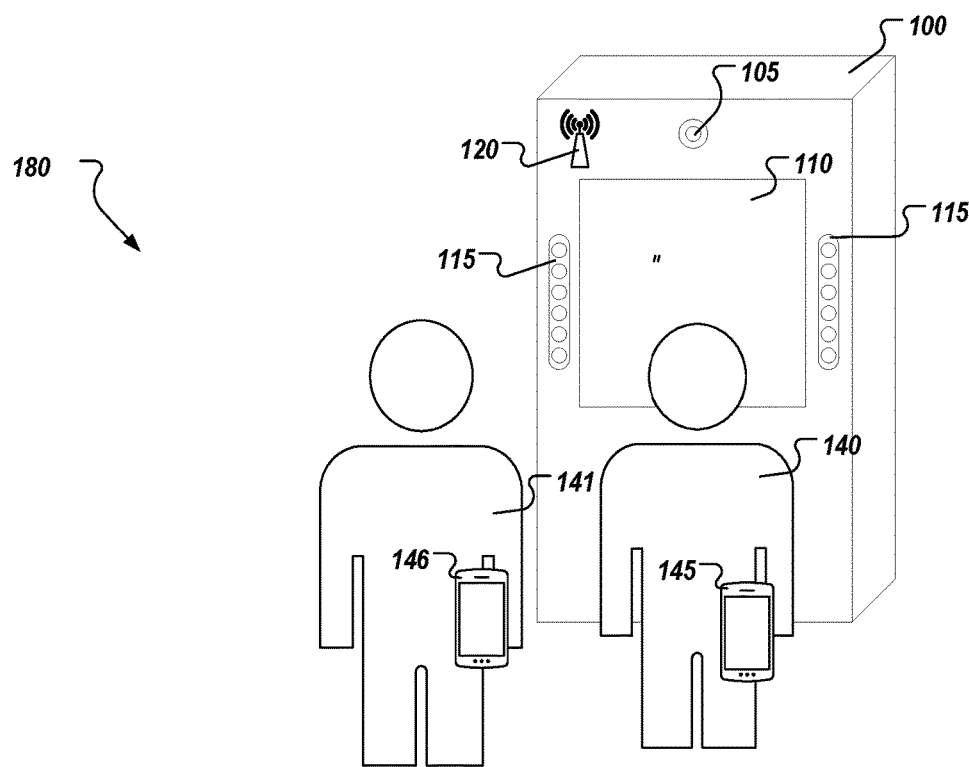
Figure 1C:
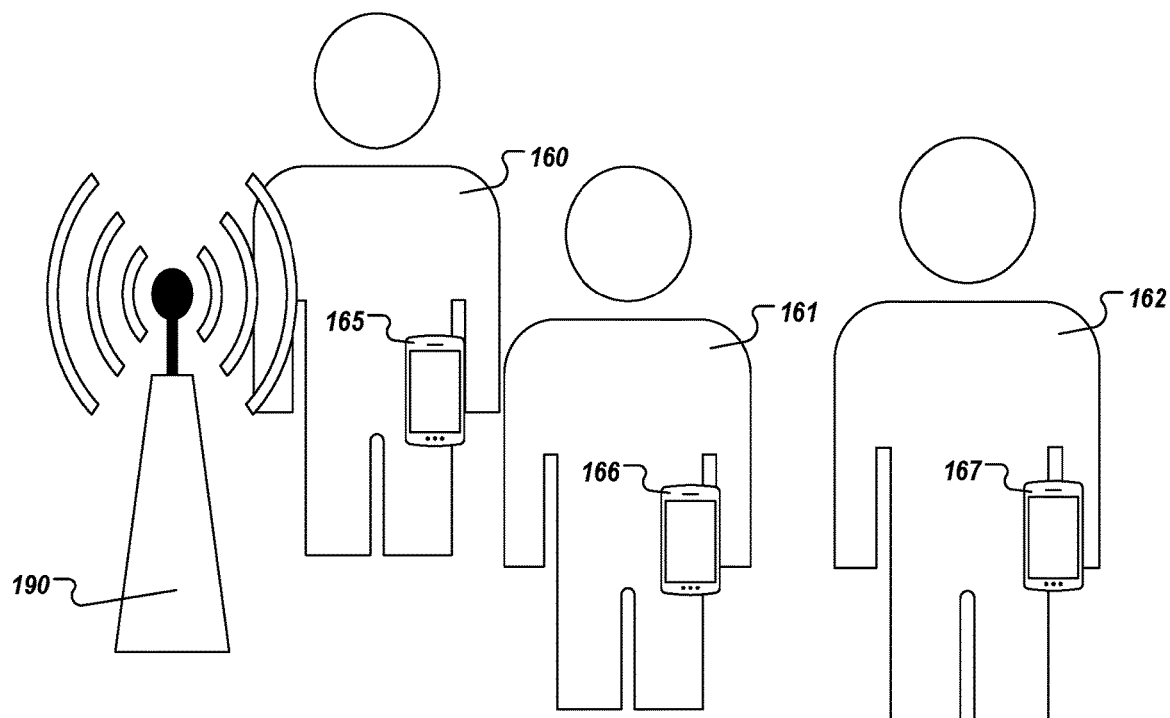

The camera 105 can be employed to capture images of the users who are interacting with the kiosk 100 (See the example environments 150 and 180 depicted in FIGS. 1B and 1C respectively). The illumination sources 115 may be employed to generate electromagnetic radiation as the camera 105 captures image data. In some examples, the captured image(s) can be processed to identify/authenticate users, and/or permit or deny access to the services/products being offered through the kiosk 100. For example, the kiosk 100 may include the display device 110 (e.g., a capacitive touch screen) that provides a user access to select and order food at a retail outlet. For example, a GUI can be displayed and interacted with users on the display device 100.

The transceiver 120 is an electronic device comprising both a transmitter and a receiver that may be combined and share common circuitry or a single housing. A transmitter produces, for example, radio waves with an antenna. The transmitter 120 may generate a radio frequency alternating current, which is applied to the antenna. When excited by this alternating current, the antenna radiates radio waves. A receiver is an electronic device that receives radio waves and converts the information carried by them to a usable form. The transceiver 120 can be employed to send and receive communication signals to/from mobile devices within the vicinity of the kiosk 100.

In some implementations, the transceiver 120 comprises a Bluetooth beacon. Bluetooth beacons are hardware transmitters. More specifically Bluetooth beacons include a class of BLE devices. Bluetooth beacons may employ BLE proximity sensing to transmit a universally unique identifier (e.g., a kiosk identifier) that can be picked up by a compatible application and/or operating system (e.g., developed with Eddystone or iBeacon). Bluetooth beacons differs from some other location-based technologies as the broadcasting device (beacon) 120 may be implemented as a one-way transmitter to the receiving mobile devices, and may necessitate a specific application installed on the mobile device to, for example, interact with the beacons or designated back-end service. This ensures that only the installed application (and not the Bluetooth beacon transmitter 120) can track users, potentially against their will, as they passively walk around the transmitters. Bluetooth beacon transmitters come in a variety of form factors, including small coin cell devices, Universal Serial Bus (USB) sticks, and generic Bluetooth 4.0 capable USB dongles. As an example, a BLE signal broadcast from the transmitter 120 may include a kiosk identifier. Nearby mobile devices be configured to perform actions when the BLE signal is received. For example, when a mobile device receives the BLE signal, it may be configured to provide (through, for example, an application) the identifier and characteristics regarding the receive BLE signal (e.g., signal strength, elapsed time, directional data, and so forth) to a back-end service. This information can be used to determine the device's physical location, track users, or trigger a location-based action from the kiosk 100.

In some implementations, the images captured using the camera 105 can be processed by the biometric authentication system to identify/authenticate the user. In some implementations, the biometric authentication system may extract from the images, various features, such as features derived from the face, iris, vasculature underlying the sclera of the eye, or the periocular region, and so forth, to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine-learning process may be implemented, at least in part, using one or more processing devices deployed on the kiosk 100. In some implementations, the kiosk 100 may communicate with one or more remote processing devices (e.g., one or more remote servers) that implement the machine learning process (see FIG. 2).

FIG. 1B depicts an example environment 150 to which kiosk machine 100 can be deployed. As an example, the environment 150 may be at a bank where the kiosk 100 is deployed as an ATM. In another example, the environment 150 may be at a restaurant or a fast-food outlet where the kiosk 100 is deployed to allow the users 140-142 to order and/or pay for food. In another example, the environment 150 may be at an entry point (e.g., at the gate of an arena or stadium) where the kiosk 100 is employed to authenticate entrants (e.g., users 140-142) prior to entering the venue. In general, the kiosk 100 may be deployed at various types of environments to authenticate users 140-142 interactively, or even without any active participation from the users 140-142.

In the example environment 100, the user 140 is standing in front of the kiosk 100 to, for example, place an order via the GUI presented on the display device 110. The users 141 and 142 are also in "close" proximity to the kiosk (e.g., the users 141 and 142 may be in a queue to place an order). The determination what a threshold distance is to consider users, such as users 141 and 142, in close proximity to the kiosk 100 is dependent on several factors. For example, one such factor may include the type of environment to which the kiosk 100 is deployed as kiosks deployed to service a larger area, such as a department store, may have a larger threshold distance than that of a kiosk deploy to a smaller space, such as a fast food restaurant or a particular department within a larger store. Other factors for the determination of such a distance threshold may include whether the kiosk is deploy inside or outside, the signal strength of the employed transceivers, such as transceiver 120 and 190 (See FIG. 1C), the type(s) of service provided by the kiosk, and so forth. As each of the user 140-142 approach the kiosk 100, a wireless connection may be established between the kiosk 100 and each of the user's respective mobile devices 145-147. These mobile devices 145-147 may be in various places on the user's person, such as in the user's hand, purse, pocket, and so forth.

In some implementations, the kiosk 100 advertises its presence via Bluetooth beacon functionality through the transceiver 120. For example, the transmitted BLE signal may include a unique identifier for the kiosk 100. When the advertised BLE signal is received by the mobile devices in proximity to the kiosk, such as the mobile devices 145-147, the devices may be programmed (e.g., through an installed application) to provide the received kiosk identifier and the BLE signal characteristics, such as described previously, along with information regarding a user associated with the device (e.g., a user identifier) to a back-end system (See FIG. 2). The back-end system may retrieve the user's baseline or template data (e.g., enrollment images) and provide this information to the kiosk 100 (based on the received kiosk identifier). The kiosk 100 may employ this information to authenticate or verify the user when user engages with the kiosk (e.g., the user interacts with the provided GUI and possess for a photo taken from the camera 105.

In alternative implementations, the mobile device may be programmed to establish a wireless connection with kiosk 100 when BLE signal is received. In such implementations, the mobile devices 145-147 may provide the user identifier along with the signal characteristics to the kiosk 100. The kiosk 100 may then user the information to retrieve the reference biometric data for the user from the back-end system through, for example, an application programming interface (API). As another example, the kiosk may retrieve the information from a local data store, which may be, for example, provided updates periodically from the back end-system.

As an example context, once the user 140 completes the selection via GUI presented on the display device 110, the user 140 may be asked to look toward the camera 105 for authentication. The images captured using the camera 105 may then be compared to the reference images for users that have been identified by the biometric authentication system as being in proximity to the kiosk 100 (e.g., the reference biometric template(s) having been retrieved and sent to the kiosk 100 through the back-end system).

In some implementations, the kiosk may search through the retrieved reference biometric templates on parallel processors. In some implementations, an overall score value is generated for each of the retrieved reference biometric templates based on the images captured using the camera 105. A match is returned (e.g., the user is authenticated) based on the highest score value and a baseline threshold score value. In some example, the kiosk 100 analyzes the information regarding the BLE signal characteristics (e.g., time in range, signal strength, signal strength change over time, and so forth) send from the mobile devices in proximity to the kiosk to, for example, the back-end system to determine the individual that is most likely to be standing in front of the camera 105.

In some implementations, a user may be authenticated when the score value exceeds a threshold value. In such implementations, reference biometric templates may be ordered and search based on a proximity of the respective users to the kiosk 100 (See FIG. 1C). Once authenticated, payment may then be automatically deducted from an account linked to the user 140.

FIG. 1C depicts an example environment 150 to which kiosk machine 100 can be deployed. The example environment 150 includes a transceiver 190 that is strategically positioned at a location a distance away from the kiosk 100. For example, the transceiver 190 may be positioned at the entrance of the example environment 150 and function as a "lighthouse" beacon.

In some implementations, the transceiver 190 comprises a Bluetooth beacon configured to broadcast a signal to mobile devices, such as mobile devices 145, 146, and 165-167, in proximity to the transceiver 190. The broadcasted signal is provided to activate the mobile device in proximity to the transceiver 190.

Figure 2:
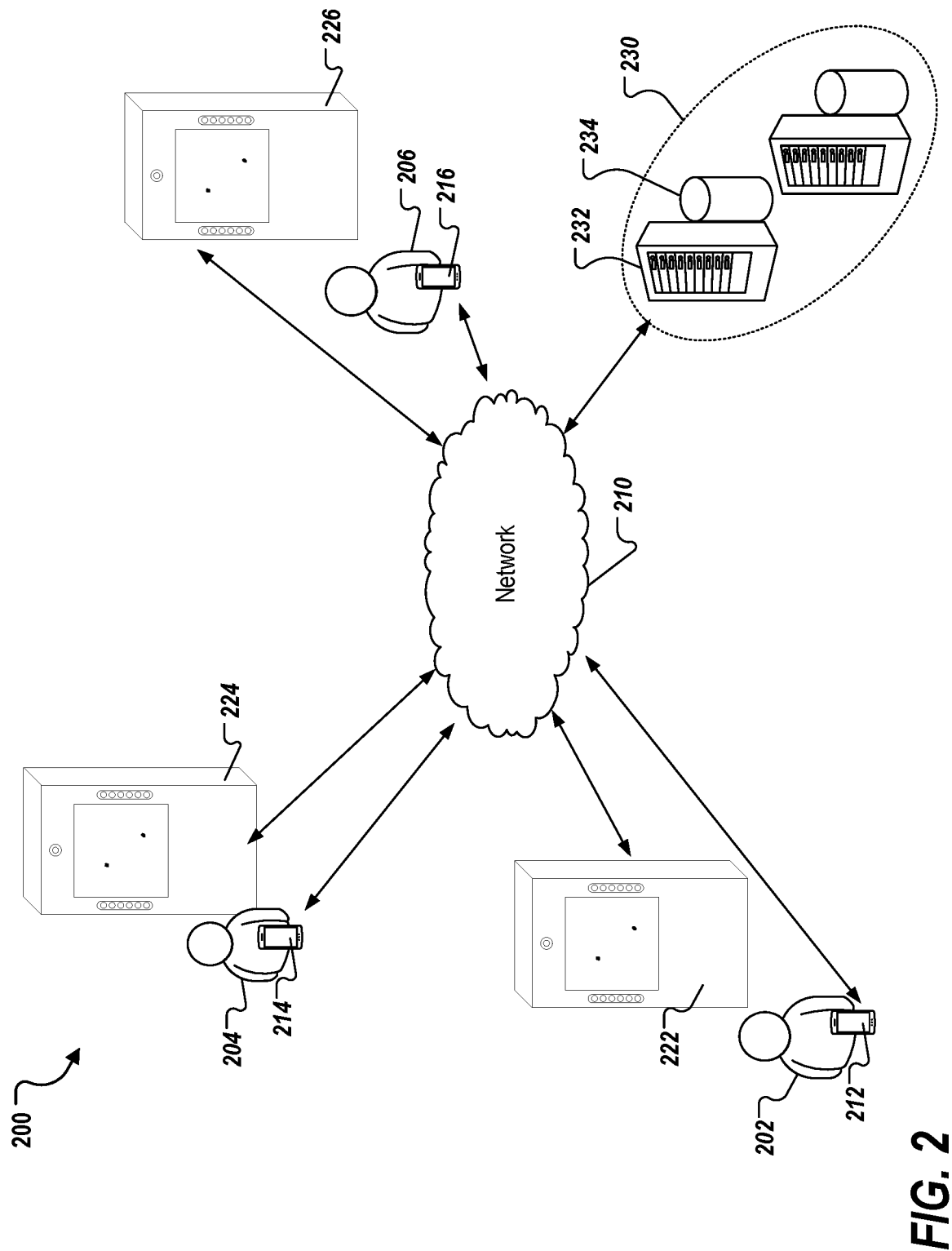
FIG. 2 depicts an example environment that can be employed to multi instances of a biometric authentication system.

In some implementations, the activated devices send information, such as the received kiosk identifier and various BLE signal characteristics to a back-end system (See FIG. 2). The back-end system may then provide the biometric template data for the users associated with each mobile device to the kiosk 100.

Using the example of when a user's, such as user 140, 141, 160-162, respective mobile device, such as the mobile devices 145, 146, and 165-167, is in a background mode, several minutes may be required for the mobile device to register a BLE beacon "ping." By employing the transceiver 190 (e.g., the lighthouse beacon) the mobile devices are provided with a broadcast signal at a greater distance away from the kiosk 100 and thus are more likely to be in an active mode and communicating with the biometric authentication system as the respective users, such as users 160-162, approach and engage with the kiosk 100 (e.g., as they approach the kiosk to order food or withdraw funds). For example, a mobile device may be in a background or "sleep" mode where the operating system pings for the BLE signal at a much less frequent rate than when in an active mode (e.g., once every few minutes versus every few seconds). The positioning of the transceiver 190 can provide the BLE signal to mobile devices that may not close enough to receive a BLE signal from the transceiver 120. In some implementations, this "light-house" beacon also allows the phone to register the "ping" in ample time to conduct the server side processing before the user walks up to the kiosk 100. As such, placing the transceiver 190 away from the kiosk 100 allows for the cover of a larger geographic space. The distance that the transceiver is placed from the kiosk 100 may depend on various factors such as the type of environment to which the kiosk (e.g., the size of the venue, inside/outside, and so forth) and types of services provided by the kiosk 100 (e.g., ATM, payment collection, and so forth).

Moreover, by examining the received BLE signal characteristics, a user's direction of travel and speed can be determined. This information can be employed to determine, for example, whether a user target is heading directly at the kiosk 100 and when he or she will arrive, or whether a user is exhibiting a particular behavior pattern (e.g., a "shopping" behavior, such as walking around the store). These determined vectors may also be analyzed using a trained machine learning algorithm to determine, for example, the likelihood that the user is in front of the kiosk 100. The light house beacon signal may also be employed to gather data regarding users that do not enter an area (e.g., the store or a section of a larger store), but whose mobile devices received the BLE signal.

FIG. 2 depicts an example environment 200 that can be employed to execute and/or coordinate multi instances of the described biometric authentication system. The example environment 200 includes network 210, a back-end system 230, mobile devices 212-216, and kiosk devices 222-226. The kiosk devices 222-226 are substantially similar to the kiosk device 100 depicted in of FIGS. 1A-1C.

In some implementations, the network 210 includes a local area network (LAN), wide area network (WAN), the Internet, or a combination thereof, and connects computing devices (e.g., the kiosk devices 222-226) and back-end systems (e.g., the back-end system 230). In some implementations, the network 210 can be accessed over a wired and/or a wireless communications link.

In the depicted example, the back-end system 230 includes at least one server system 232 and a data store 234. In some implementations, the back-end system 230 provides access to one or more computer-implemented services with which the kiosks 222-226 and mobile devices 212-216 may interact. The computer-implemented services may be hosted on, for example, the at least one server system 232 and the data store 234. The computer-implemented services may include, for example, an authentication service that may be used by the kiosks 222-226 to authenticate a user based on collected image data. For example, as part of a biometric authentication service, the server system 232 may receive a unique identifier for one of the kiosks 222-226 and an user associated with the mobile device, such as users 202-206, through an API call initiated from one of the mobile devices 212-216 when the mobile device receives a BLE signal from the kiosk (or respective light house beacon). The server system 232 may then provide the reference biometric templates for the user to the respective kiosk for user authentication.

In some implementations, the server system 232 may retrieve the reference templates for a user from data store 234. This information (e.g., the unique identifier and/or the reference templates) is provided to a kiosk. The kiosk may then load the received information into active memory for caparison to active real-time images of users provided by the respective kiosk. In some implementations, the data may have a timeout value and be pulled from active memory based on the timeout value and/or when a user is matched to the retrieved template data.

In some implementations, the back-end system 230 includes computer systems employing clustered computers and components to act as a single pool of seamless resources when accessed through the network 210. For example, such implementations may be used in data center, cloud computing, storage area network (SAN), and network attached storage (NAS) applications. In some implementations, the back-end system 230 is deployed and provides computer-implemented services through a virtual machine(s).

Figure 3:
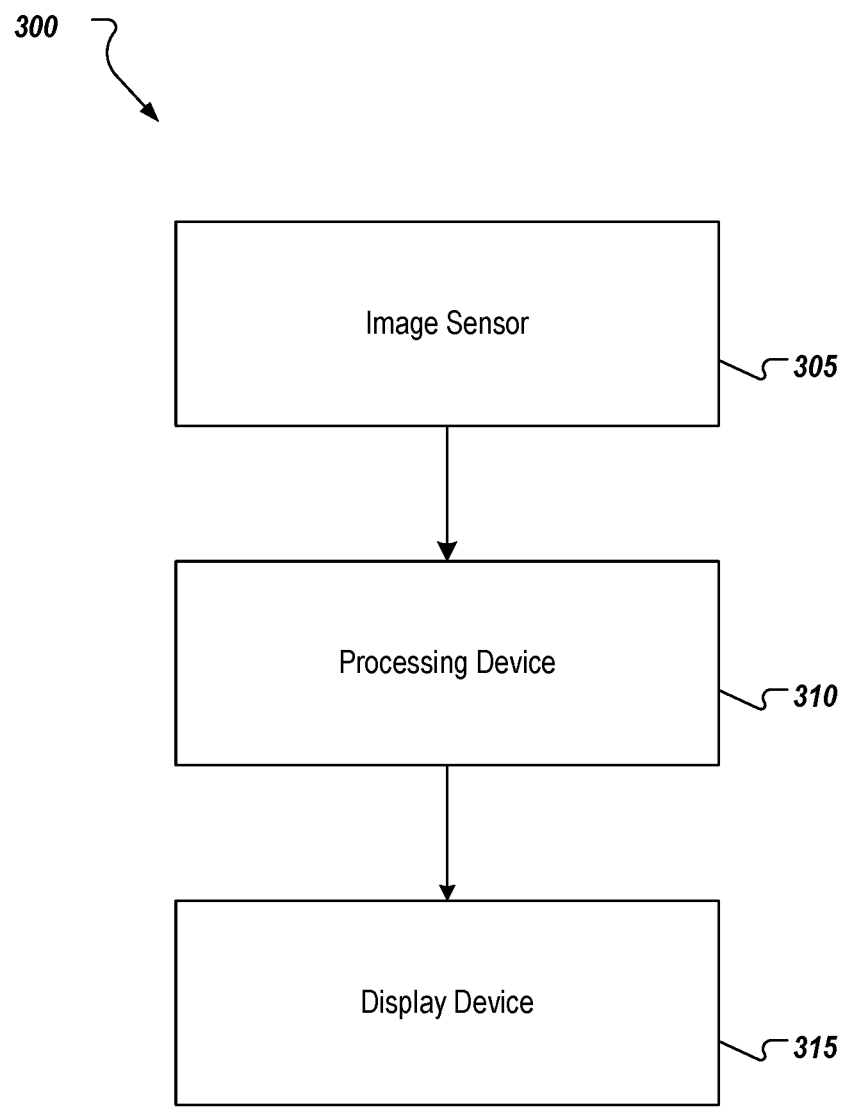
FIG. 3 depicts a system that can be used to implement the technology described herein.

FIG. 3 depicts a system 300 that can be used to implement the technology described herein. The system 300 includes image sensor 305, a processing device 310, and a display device 315. In come implementations, the system 300 may be included within a kiosk, such as described with reference to FIG. 1. For example, the display device 315 can be the display device 110 and the image sensor 305 can be a component of the camera 105. In some implementations, the display device 315 can be disposed on a mobile device, such as a smartphone, tablet computer, or an e-reader. The image sensor 305 detects and conveys the information that constitutes an image. Types of image sensors include, for example, complementary metal-oxide-semiconductor (CMOS) and charge-coupled devices (CCD). Outputs from an image sensor 305 can be processed using one or more processing devices 310. In some implementations, the output of the one or more processing devices 310 may be used to drive a display device 315. The one or more processing devices 310 can be configured to process the outputs from the image sensor 305 in various ways. In some implementations, the one or more processors 310 are configured to implement a photometric stereo reconstruction process to generate a 3D representation of the subject.

Figure 4:
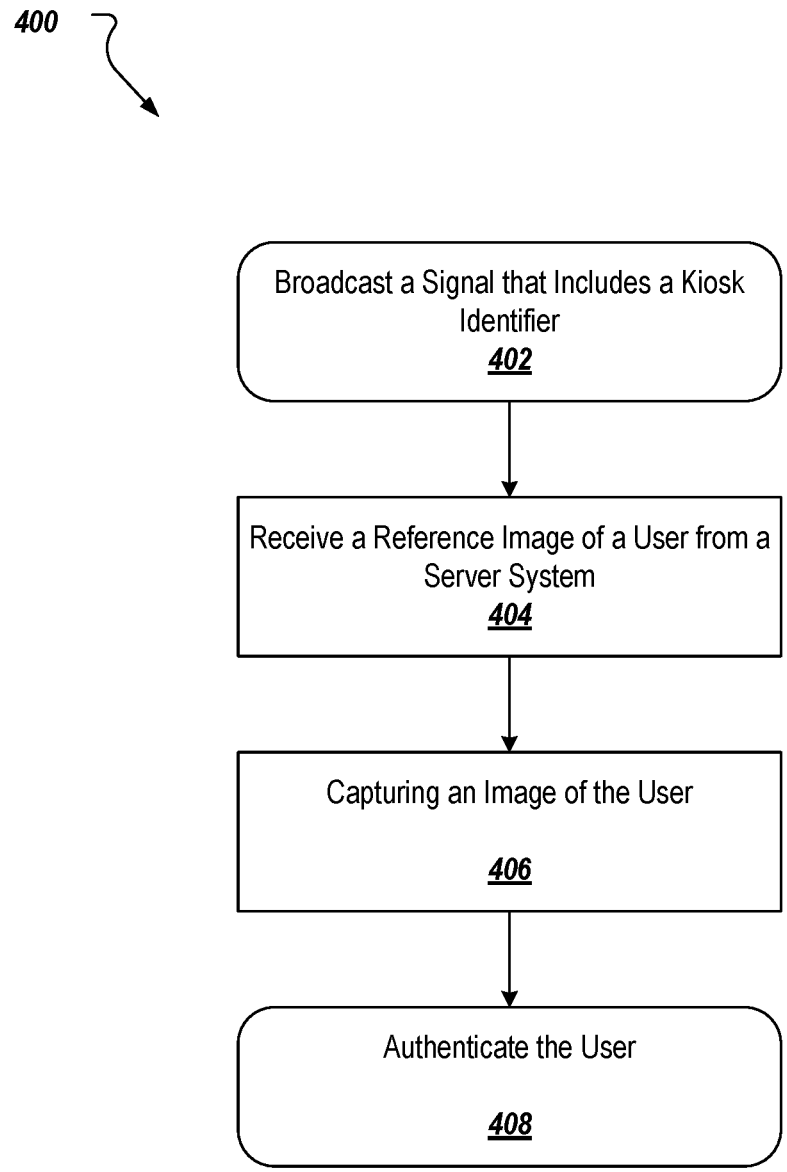
FIG. 4 is a flowchart of an example process employed within a biometric authentication system.

FIG. 4 depict a flow diagrams of example processes 400 that can be employed within a biometric authentication system deployed on a kiosk device, such as kiosk 100 of FIG. 1A, for authenticating a user at the kiosk device. For clarity of presentation, the description that follows generally describes process 400 in the context of FIGS. 1A-1C, 2, 3, and 4. However, it will be understood that processes 400 may be performed, for example, by any other suitable system, environment, software, and hardware, or a combination of systems, environments, software, and hardware as appropriate. In some implementations, various steps of the processes 400 can be run in parallel, in combination, in loops, or in any order.

At 402, a signal that includes a kiosk identifier is broadcast though a transceiver. In some implementations, the transceiver comprises a Bluetooth beacon and the signal comprises a BLE signal. In some implementations, the transceiver is located a threshold distance away from the kiosk device such that the mobile computing device receives the signal while in a background mode and before switching to an active mode to engage with the kiosk device. In some implementations, the mobile computing device associated with the user provides characteristics of the signal to the server system. In some implementations, the characteristics of the signal include signal strength, elapsed time, or directional data. From 402, the process 400 proceeds to 404.

At 404, a reference image of the user is received from a server system based on a mobile computing device associated with the user having received the signal and providing the kiosk identifier to the server system. In some implementations, the reference image of the user was captured during an enrollment process. From 404, the process 400 proceeds to 406.

At 406, an image of the user is captured with a camera. From 406, the process 400 proceeds to 408.

At 408, the user is authenticated based on a comparison of the captured image of the user to the reference image of the user based on a comparison of the captured image of the user to the reference image of the user. In some implementations, the authentication of the user is based on the score value meeting a threshold, where the score value is generated based on comparing the captured image of the user to the reference image. In some implementations, features derived from a face of the user, an iris of the user, or vasculature underlying a sclera of an eye of the user are extracted from the captured image of user. In such implementations, the score value may be based on comparing the extracted user features to like features extracted from the reference image. In some implementations, authenticating the user is based on a comparison of the captured image of the user to the reference image of the user and reference images of a plurality of other users, where the other users are identified as within a threshold distance from the kiosk device. In some implementations, the reference image of the user and the reference images of the plurality of other users are ordered based on a determined proximity of a respective mobile device for each of the users. In such implementations, each of the mobile devices having provided the kiosk identifier to the server system. In some implementations, payment is deducted from an account linked to the user based on the authentication of the user. In some implementations, information is displayed on a display to the user based on the authentication of the user. From 408, the process 400 ends.

Figure 5:
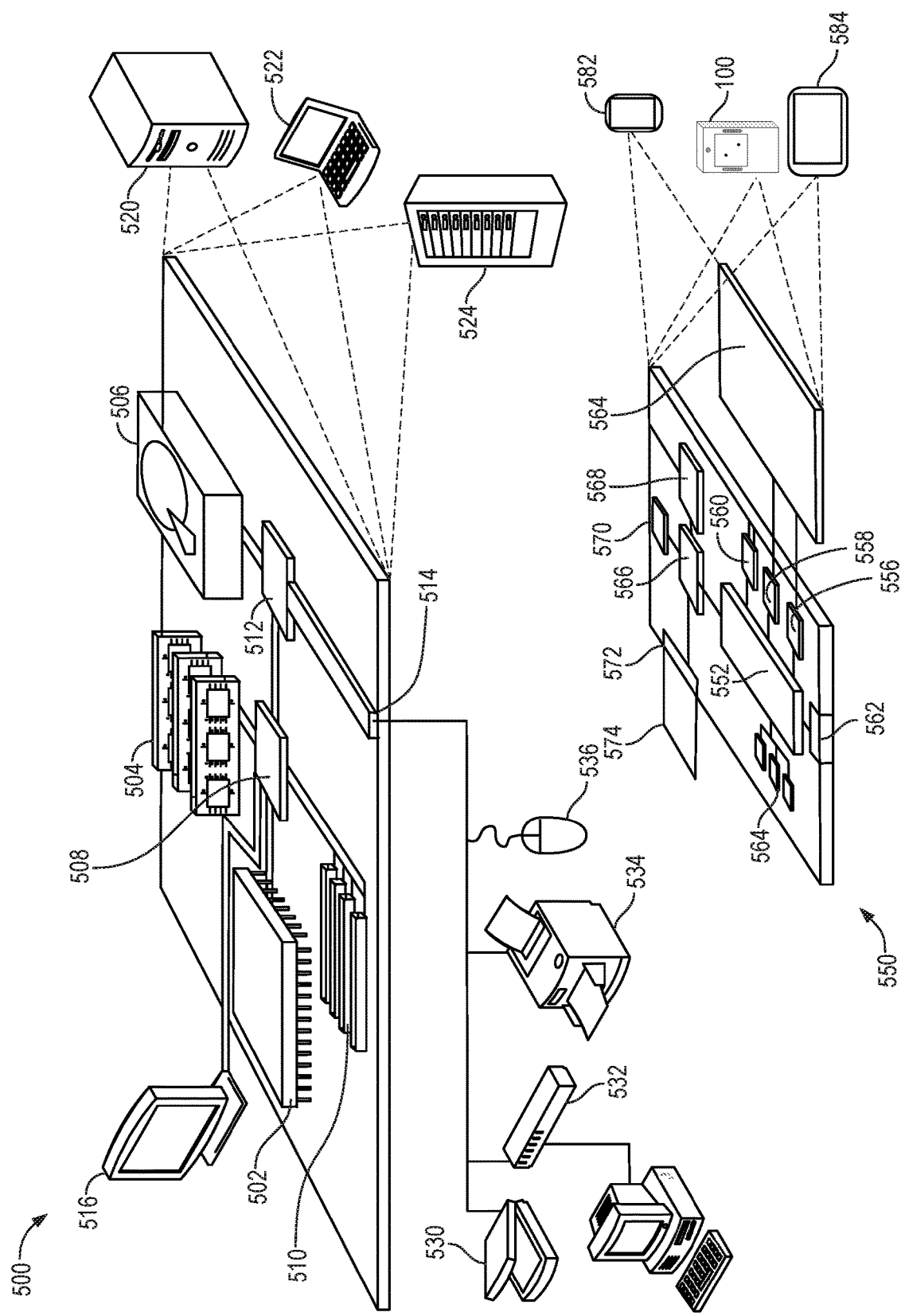
FIG. 5 is a block diagram representing examples of computing devices.

FIG. 5 shows an example of a computing device 500 and a mobile computing device 550 that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices. Such input/output devices may include a scanner 530, a printing device 534, or a keyboard or mouse 536. The input/output devices may also be coupled to the low-speed expansion port 514 through a network adapter. Such network input/output devices may include, for example, a switch or router 532.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC)

processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, it may be implemented the kiosk 100 described in FIG. 1. Other implementations may include a mobile device 582 and a tablet device 584. The mobile computing device 550 may also be implemented as a component of a smartphone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 110 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method of authentication, the method comprising:
   receiving, at one or more server devices, from each of a plurality of mobile devices, a transmission that includes a kiosk identifier, the kiosk identifier identifying a kiosk device remote from the one or more server devices and within a threshold distance of each of the plurality of mobile devices;
   receiving, at the one or more server devices, from each of the plurality of mobile devices, over a connection that bypasses the kiosk device, signal characteristics of respective wireless signals received by each of the plurality of mobile devices from a transceiver associated with the kiosk device, wherein the signal characteristics comprise signal strength, elapsed time, directional data, or a combination thereof;
   identifying, for each of the plurality of mobile devices, a reference image associated with a corresponding user, wherein the identified reference images form a subset of references images in a database of reference images captured for various users during corresponding enrollment processes, the database being stored in the one or more server devices;
   transmitting the signal characteristics, by the one or more server devices, to the kiosk device over a connection that bypasses the plurality of mobile devices; and
   transmitting, by the one or more server devices, to the kiosk device, the identified reference image corresponding to each of the plurality of mobile devices, the identified reference images being usable by the kiosk device to perform an authentication process comprising comparing one or more of the identified reference images to a user image captured by the kiosk device, a number of the identified reference images searched during the authentication process being smaller than a number of the reference images in the database.

2. The computer-implemented method of claim 1, wherein the authentication process comprises generating a plurality of score values based on comparing the user image captured by the kiosk device to one or more of the identified reference images, wherein a user in the user image is authenticated responsive to a score value of the plurality of score values meeting a threshold.

3. The computer-implemented method of claim 2, wherein the authentication process comprises extracting, from the user image, features derived from a face of the user, an iris of the user, or vasculature underlying a sclera of an eye of the user, wherein each score value of the plurality of score values is based on comparing the extracted features to like features extracted from one of the identified reference images.

4. The computer-implemented method of claim 1, wherein the transceiver is located a second threshold distance away from the kiosk device.

5. The computer-implemented method of claim 1, wherein the identified reference images are loaded into an active memory of the kiosk device.

6. The computer-implemented method of claim 1, wherein the authentication process comprises searching the identified reference images in an order based on a determined proximity of each of the plurality of mobile devices to the kiosk device.

7. The computer-implemented method of claim 1, comprising:
   deducting payment from an account linked to a user in the user image based on authentication of the user.

8. The computer-implemented method of claim 1, wherein each identified reference image has a timeout value after which the identified reference image is pulled from a memory of the kiosk device.

9. A non-transitory, computer-readable medium storing one or more instructions executable by a computer system to perform operations comprising:
   receiving, at one or more server devices, from each of a plurality of mobile devices, a transmission that includes a kiosk identifier, the kiosk identifier identifying a kiosk device remote from the one or more server devices and within a threshold distance of each of the plurality of mobile devices;
   receiving, at the one or more server devices, from each of the plurality of mobile devices, over a connection that bypasses the kiosk device, signal characteristics of respective wireless signals received by each of the plurality of mobile devices from a transceiver associated with the kiosk device, wherein the signal characteristics comprise signal strength, elapsed time, directional data, or a combination thereof;
   identifying, for each of the plurality of mobile devices, a reference image associated with a corresponding user, wherein the identified reference images form a subset of references images in a database of reference images captured for various users during corresponding enrollment processes, the database being stored in the one or more server devices;

transmitting the signal characteristics, by the one or more server devices, to the kiosk device over a connection that bypasses the plurality of mobile devices; and transmitting, by the one or more server devices, to the kiosk device, the identified reference image corresponding to each of the plurality of mobile devices, the identified reference images being usable by the kiosk device to perform an authentication process comprising comparing one or more of the identified reference images to a user image captured by the kiosk device, a number of the identified reference images searched during the authentication process being smaller than a number of the reference images in the database.

10. The non-transitory, computer-readable medium of claim 9, wherein the transceiver is located a second threshold distance away from the kiosk device.

11. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
receiving, at one or more server devices, from each of a plurality of mobile devices, a transmission that includes a kiosk identifier, the kiosk identifier identifying a kiosk device remote from the one or more server devices and within a threshold distance of each of the plurality of mobile devices;
receiving, at the one or more server devices, from each of the plurality of mobile devices, over a connection that bypasses the kiosk device, signal characteristics of respective wireless signals received by each of the plurality of mobile devices from a transceiver associated with the kiosk device, wherein the signal characteristics comprise signal strength, elapsed time, directional data, or a combination thereof;
identifying, for each of the plurality of mobile devices, a reference image associated with a corresponding user, wherein the identified reference images form a subset of references images in a database of reference images captured for various users during corresponding enrollment processes, the database being stored in the one or more server devices;
transmitting the signal characteristics, by the one or more server devices, to the kiosk device over a connection that bypasses the plurality of mobile devices the signal characteristics; and
transmitting, by the one or more server devices, to the kiosk device, the identified reference image corresponding to each of the plurality of mobile devices, the identified reference images being usable by the kiosk device to perform an authentication process comprising comparing one or more of the identified reference images to a user image captured by the kiosk device, a number of the identified reference images searched during the authentication process being smaller than a number of the reference images in the database.

12. The system of claim 11, wherein the transceiver is located a second threshold distance away from the kiosk device.

13. The system of claim 11, wherein the authentication process comprises generating a plurality of score values based on comparing the user image captured by the kiosk device to one or more of the identified reference images, wherein a user in the user image is authenticated responsive to a score value of the plurality of score values meeting a threshold.

14. The computer-implemented method of claim 1, wherein each identified reference image is pulled from a memory of the kiosk device responsive to a user being matched to the identified reference image.

* * * * *

UNITED STATES PATENT AND TRADEMARK OFFICE
CERTIFICATE OF CORRECTION

PATENT NO. : 10,984,223 B2
APPLICATION NO. : 16/796529
DATED : April 20, 2021
INVENTOR(S) : Gregory Lee Storm et al.

It is certified that error appears in the above-identified patent and that said Letters Patent is hereby corrected as shown below:

In the Claims

Column 18, Line 13, in Claim 11, delete "devices the signal characteristics;" and insert -- devices; --, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*